United States Patent [19]

Chowdhury et al.

[11] 4,395,339
[45] Jul. 26, 1983

[54] METHOD OF OPERATING PURE OXYGEN WET OXIDATION SYSTEMS

[75] Inventors: Ajit K. Chowdhury, Schofield; Gerald L. Bauer, Rothschild; Richard W. Lehmann, Rib Mountain, all of Wis.

[73] Assignee: Sterling Drug Inc., New York, N.Y.

[21] Appl. No.: 364,536

[22] Filed: Apr. 1, 1982

[51] Int. Cl.³ .......................... C02F 1/74; C02F 11/08
[52] U.S. Cl. ...................................... 210/761; 162/31; 210/738
[58] Field of Search .............. 210/739, 761, 218, 758, 210/760, 762; 162/31

[56] References Cited

U.S. PATENT DOCUMENTS

| | | | |
|---|---|---|---|
| 2,665,249 | 1/1954 | Zimmermann | 210/761 |
| 2,824,058 | 2/1958 | Zimmermann | 210/761 |
| 2,903,425 | 9/1959 | Zimmermann | 210/761 |
| 2,932,613 | 4/1960 | Huesler et al. | 210/761 |
| 3,042,489 | 7/1962 | Schoeffel | 423/529 |
| 3,097,988 | 7/1963 | Schoeffel | 162/31 |
| 3,272,739 | 9/1966 | Earle et al. | 210/761 |
| 3,647,687 | 3/1972 | Matthiesen | 210/761 |
| 3,654,070 | 4/1972 | Pradt et al. | 162/30.1 |
| 3,852,192 | 12/1974 | Fassell et al. | 210/761 |
| 3,870,631 | 3/1975 | Fassell et al. | 210/762 |
| 3,920,548 | 11/1975 | Fassell et al. | 210/761 |
| 4,017,421 | 4/1977 | Othmer | 210/761 X |
| 4,100,730 | 7/1978 | Pradt | 210/761 X |
| 4,139,461 | 2/1979 | Bauer | 210/761 |
| 4,217,218 | 8/1980 | Bauer | 210/761 |
| 4,350,599 | 9/1982 | Chowdhury | 210/761 |

FOREIGN PATENT DOCUMENTS 2034684  6/1980  United Kingdom ............... 210/761

Primary Examiner—Robert H. Spitzer
Attorney, Agent, or Firm—Allen H. Erickson; Thomas L. Johnson; B. Woodrow Wyatt

[57] ABSTRACT

A method comprising operating steps required for safely operating wet oxidation reactors in which combustible substances are oxidized at elevated temperatures and pressures using pure oxygen. The steps satisfy the criteria that a potential of oxidation is established prior to introducing oxygen and maintained until after oxygen flow is stopped; that an inert gas, either from an external source or generated in situ, is present in the reactor from before oxygen flow is introduced until after oxygen flow is stopped; and that the oxygen introducing means is clean for oxygen use from prior to the introduction of oxygen flow until after the oxygen flow is stopped.

8 Claims, No Drawings

METHOD OF OPERATING PURE OXYGEN WET OXIDATION SYSTEMS

BACKGROUND OF THE INVENTION

1. Field of the Invention

This invention relates to safe operation of wet oxidation systems using pure oxygen.

2. Description of the Prior Art

Wet oxidation is a well established process for treating aqueous waste waters or sludge which contain oxidizable substances; more than one hundred wet oxidation units are in commercial operation. A number of patents and other publications disclose wet oxidation processes in which air is used as the source of oxygen for oxidation of the wastes. A smaller number of patents disclose that pure oxygen or an oxygen enriched gas may be the oxidizing agent in wet oxidation processes. Among these are Schoeffel U.S. Pat. Nos. 3,042,489 and 3,097,988; and Pradt et al. U.S. Pat. No. 3,654,070. However, none of these patents disclose how a wet oxidation process using pure oxygen would be designed or operated.

In wet oxidation systems, aqueous and gaseous phases coexist at elevated pressures and temperatures. System pressures are chosen so that there will always be an aqueous phase. Oxidation reactions consume oxygen and generate carbon dioxide. When the aqueous phase has a neutral or low pH, a major portion of the carbon dioxide formed by wet oxidation will remain in the gaseous phase, diluting the oxygen. When the aqueous phase is caustic, however, much of the carbon dioxide will be absorbed in the aqueous phase.

The quantity of water vapor which is present in the gas phase is a function of temperature, pressure, and quantity of non-condensible gases (NCG), and can be determined by known thermodynamic relationships. For a given system operating at a nearly uniform pressure, the degree of gas dilution by water vapor is much greater at the higher temperatures.

In prior art processes using air as the source of oxygen, the percentage of oxygen in the gas phase at elevated temperatures and pressures is considerably less than 21 percent, even without any oxygen consumption. For example, at 550° F. and 1000 psi pressure, water vapor dilutes the oxygen from its original 21 percent to a concentration of about 5 percent. As oxygen is consumed its concentration at reactor conditions drops to very low values. Therefore, pure oxygen or oxygen enriched gas can be used advantageously in enhancing the rate and completeness of oxidation, so long as the safety of the process can be ensured.

Gaseous oxygen, when diluted to a concentration of 21 mole percent as in the form of air, is safe to handle, even when compressed to quite high pressures.

However, oxygen at higher concentrations, especially high purity oxygen, is likely to undergo rapid, spontaneous combustion when placed in contact with organic or other oxidizable substances at pressures above atmospheric, even at room temperature. In the wet oxidation process, high concentrations of oxidizable materials are deliberately oxidized. It is vital to control the process so that transient excursions of temperature, pressure, and thermal efficiency are minimal and hazardous operating conditions do not occur.

Moreover, many metals such as steel, aluminum and titanium, for example, will burn vigorously in the presence of oxygen once an ignition has occurred. Titanium itself has been shown to be capable of undergoing spontaneous combustion under certain conditions in the presence of oxygen and water at elevated pressures.

In the handling of oxygen, traditional safety practice has emphasized selection of materials of construction which will not themselves undergo spontaneous combustion at design operating conditions, and strict cleanliness standards to ensure that no contaminants capable of spontaneous combustion are present in the system. In wet oxidations, however, the choice of materials of construction is nearly always constrained by the corrosive properties of the wastewater, sludge, or slurry being oxidized. Thus, titanium or titanium alloys may be dictated as the material of construction when severe corrosion of iron- or nickle-based alloys is indicated. Moreover, the wet oxidation system treats wastewaters, sludges, or slurries which may contain up to ten percent or even higher concentrations of organic substances, and the reactor interior surfaces may typically be contaminated with substances capable of spontaneous combustion upon contact with high oxygen concentrations at high pressures.

When pure oxygen is used in a wet oxidation system, purge water must be mixed with the oxygen in order to prevent backflow of waste or fuel into the oxygen supply lines. Such backflow may contaminate those lines with combustable substances and lead to unsafe conditions. Also, when pure oxygen is used in a wet oxidation system it must be diluted by an inert gas to prevent formation of unsafe oxygen concentrations in the reactor and down-stream piping. The diluting gas can be nitrogen, air, carbon dioxide, or another inert gas. If a first diluting gas is being injected into a wet oxidation system and if sufficient carbon dioxide is being generated and liberated into the gas phase to perform the dilution of the oxygen, then the flow of the first diluting gas may be shut off.

It has been discovered that when pure oxygen is used in wet oxidation systems, most of the opportunities for unsafe operation occur during startup, shut-down and transient process upsets during otherwise steady-state operation. Specific sequences of operating steps have now been found which are necessary to safe operation of such pure oxygen wet oxidation systems.

Some of the individual steps of this invention have been disclosed previously. However, the sum total of all the steps and procedures of this invention are unique and economically valuable.

SUMMARY OF THE INVENTION

This invention consists of the operating procedures needed for the safe operation of a wet oxidation unit which uses pure oxygen. The invention includes especially the procedures for startup and shutdown of the wet oxidation process and the procedures to be followed in the event of a process upset. As part of our invention we have developed certain criteria which must be met in order for the wet oxidation process to be safely operated. These criteria determine the steps or procedures to be followed during startup, shutdown, and process upsets, and therefore, the procedures and steps which meet the criteria for safe operation are part of the invention.

The present invention is a method for startup, operation and shutdown of a wet oxidation apparatus which uses a flow of pure oxygen for oxidizing combustible substances, said apparatus including a reactor, valved means for introducing water and combustible substance into said reactor, valved means for introducing a flow of pure oxygen into said reactor, valved means for passing gaseous and liquid combustion products from said reactor, valved means for introducing a stream of purge water into oxygen introducing means, valved means for introducing cleaning solution into said oxygen introducing means, and valved means for purging said reactor with an inert diluent gas.

The method comprises the steps of initiating a potential for oxidation in said reactor prior to starting the flow of oxygen to said reactor, and maintaining the potential for oxidation until the flow of oxygen is stopped; starting a continuous purge of inert diluent gas into said reactor prior to starting the flow of oxygen, and continuing the addition or in situ generation of inert gas in the reactor until after the flow of oxygen is stopped; and cleaning the portion of the oxygen introducing means within said reactor with a cleaning solution and subsequently introducing a stream of purge water into oxygen introduction means prior to starting the flow of oxygen to said reactor, and continuing the flow of said purge water until after said flow of oxygen is stopped.

Practice of this invention ensures that three criteria necessary to safe operation are satisfied:

1. From a time before the flow of oxygen is started and until after the flow of oxygen is shut off the reactor must be maintained in a condition where potential for oxidation exists. A potential for oxidation is a condition such that if oxygen is fed to the system oxidation will spontaneously occur. A potential for oxidation thus requires the presence of an oxidizable substance and a temperature high enough for oxidation to freely occur. A potential for oxidation will still exist during steady state operation of the wet oxidation system even if excess oxygen is being fed to the reactor and some oxygen appears in the reactor offgas, as long as combustible materials are fed to the reactor and oxygen is being freely consumed by those combustibles in the reactor. The most significant aspect of this criterion is that the potential for oxidation must be established before the flow of oxygen to the wet oxidation process is started and that the potential for oxidation must be maintained until the flow of oxygen is shut off.

2. Before the flow of oxygen is started to the wet oxidation process a continuous purge of a diluent gas into the reactor must be started. The flow of some diluent gas must be continued until after the flow of oxygen is shut off. An inert diluting gas must be used with pure oxygen, and the diluting gas may be nitrogen, air, or even carbon dioxide formed during the oxidation process itself. A flow of a diluting gas from an external source used during startup may be shut off when sufficient carbon dioxide is generated within the reactor by the wet oxidation process, and must be restarted at shutdown when carbon dioxide is no longer being generated. This invention specifies when the diluent gas flow is used. It explains what steps must be accomplished and in what order and thus teaches how the use of a diluent gas is implemented in a pure oxygen wet oxidation apparatus.

3. From a time before the introduction of oxygen to the wet oxidation system until after the oxygen flow is shut off the oxygen supply pipelines up to the point at which the oxygen is actually mixed with waste or fuel mixture must be clean for oxygen service and must be under a continuous purge with water. The present invention teaches how the water purge is incorporated into the operating procedure for a wet oxidation unit which uses pure oxygen, and in what order the operating steps must be carried out to ensure safe operation.

The three criteria determine the steps to be carried out and the order in which they must be carried out during startup or shutdown of a wet oxidation system using pure oxygen, or during a process upset.

In this application the term "pure oxygen" means commercially pure oxygen or oxygen enriched air having an oxygen concentration of at least 50 percent. At these concentrations, spontaneous combustion of some organic substances may occur even at ambient temperatures. At elevated temperatures and pressures hazards presented by high oxygen concentrations are more pronounced. This invention provides for safe operation by satisfying the criteria necessary for safety.

DESCRIPTION OF PREFERRED EMBODIMENTS

A cold startup is the startup of a wet oxidation unit which has not before been operated or has been previously shut down to the point that process vessels are empty and all parts of the unit are at essentially ambient temperature. The steps required by this invention for a cold startup are:

(a) filling the reactor to a predetermined operating level with water or a water-combustible substance mixture;

(b) heating the reactor and water or water-combustible substance mixture to a temperature equalling or exceeding the ignition temperature;

(c) introducing into the reactor a compressed inert diluent gas to pressurize the reactor to a pressure in excess of the saturated steam pressure at the ignition temperature;

(d) introducing a flow of combustible substance to the reactor;

(e) introducing a cleaning solution into the oxygen introducing means to clean the oxygen introducing means for oxygen service;

(f) introducing a stream of purge water into the oxygen introducing means; and (g) introducing a continuous purge of the reactor with an inert diluent gas.

All of the steps must be carried out prior to initiating the flow of oxygen into the reactor.

The oxygen flow to the wet oxidation system is then started up at a low flow rate. The flow of oxygen must be low enough and the flow of inert diluting gas must be high enough that the oxygen concentration in the off gas does not rise above 21 percent by volume and preferably not more than 10 percent during the startup.

The ignition temperature (also known as lightoff temperature) is defined as the temperature at which, under the particular reactor conditions, sufficient oxidation will occur to maintain or increase the temperature of the reactor contents. The ignition temperature is a function of the type and concentration of combustible substance, reactor pressure, type of oxidant (e.g., air or oxygen), system heat losses, etc. In most cases the ignition temperature is 25°–200° F. below the desired steady-state wet oxidation temperature.

The cleaning solution used to clean the oxygen introducing means is an inorganic cleaner such as heated sodium metasilicate solution. Cleaners or solvents which may leave traces of organic materials in the oxygen lines should not be used.

To attain steady state operation of the wet oxidation system, the flow rates of oxygen and waste or fuel mixture are adjusted so that the desired steady state flow rates are reached and so that the oxygen concentration in the offgas does not exceed 21 percent by volume and preferably not more than 10 percent by volume. Simultaneously, heat generated by the oxidation reactions will rapidly raise the reactor temperature to the desired level.

When the offgas oxygen concentration reaches a low and steady level and when sufficient $CO_2$ appears in the offgas to act as a portion or all of the inert diluting gas, the flow of inert diluent gas started in step (g) is reduced or shut off. The wet oxidation system is now completely started up and operating at steady state.

Each of the seven startup steps (a) through (g) are needed to satisfy the three criteria for safe operation before the flow of oxygen can be started to the unit, and thus they must all be carried out as part of the invention. Steps (a), (b), and (d) are needed to establish and ensure a potential for oxidation in the reactor. The potential for oxidation prevents pockets of high purity oxygen from collecting in the reactor or down stream piping by ensuring that the oxygen will begin to be consumed as soon as it enters the reactor, and by forming diluent carbon dioxide gas from the oxidation reactions. Obviously, step (a) must be carried out before (b) and (d) but the order of steps (b) and (d) may be reversed.

Steps (c) and (g) ensure that an inert diluting gas is flowing through the reactor at the time oxygen is introduced to further dilute the oxygen concentration and to provide double assurance that pockets of high purity oxygen will not develop in the reactor or down stream piping. Step (c) is preferably carried out after step (a) and before step (g).

Steps (e) and (f) ensure that the oxygen supply pipelines are properly free of hazardous contaminants before the oxygen flow starts and that contamination of the oxygen supply pipelines does not occur while the oxygen flow is on. Step (e) is preferably carried out before step (f).

All of the above described startup steps must be carried out before the flow of pure oxygen is started. Obviously many other steps could be inserted into the startup procedure (something as trivial as turning on a switch to start a pump) but as long as the startup steps (a) through (g) are carried out at some point before the oxygen flow is started the requirements of this invention are met. Moreover, the order in which the prestartup steps are carried out may be changed somewhat, except as specified in the paragraphs above, and the requirements of the invention will still be satisfied.

In the preferred method of cold startup, step (a) precedes steps (b) and (d), step (c) precedes step (g) but follows step (a), and step (e) precedes step (f).

There will be times when a wet oxidation system is to be started up from a hot, bottled condition. A wet oxidation system in a hot bottled condition has been purged of most oxygen but left full of hot waste or hot water from a previous period of operation. Block valves around the reactor have been closed to prevent the reactor contents from escaping and to maintain pressure inside the reactor.

Thermal losses will gradually cool a hot bottled reactor. Hence, while a reactor bottled for a short time will have a temperature in excess of the ignition temperature, in time the temperature will drop to a lower value.

The same three criteria for safe operation must be satisfied in order for the wet oxidation system to be safely started up.

The procedures or steps needed to safely start up the hot, bottled wet oxidation system are as follows, all of which must be carried out prior to initiating a flow of pure oxygen into the reactor:

(a) each of the means for introducing water, oxygen and inert gas is flooded with water; this requires opening the block valves on these lines;

(b) the reactor contents are heated to a temperature equalling or exceeding the ignition temperature;

(c) a compressed inert diluent gas is introduced into the reactor to pressurize the reactor to a pressure in excess of the saturated steam pressure at the ignition temperature;

(d) a flow of combustible substance is introduced into the reactor;

(e) a cleaning solution is introduced into the means for introducing oxygen to the reactor, in order to clean the oxygen line within the reactor for oxygen service;

(f) a stream of purge water is introduced into the oxygen line to the reactor (ie, the oxygen introducing means); and (g) a continuous purge of an inert diluent gas is introduced into the reactor.

As before, the first seven steps of this procedure must be completed before the flow of oxygen is started up in order for the procedure to meet the requirements of this invention. Step (a) must be carried out first. While steps (b) through (g) may be carried out in any order to satisfy the three safe operation criteria of this invention, the preferred method provides additionally that step (c) precedes step (g) and step (e) precedes step (f).

To attain steady state operation of the wet oxidation system, the flow rates of oxygen and waste or fuel mixture are adjusted so that the desired steady state flow rates are reached and so that the oxygen concentration in the offgas does not exceed 21 percent by volume and preferably not more than 10 percent by volume. Simultaneously, heat generated by the oxidation reactions will rapidly raise the reactor temperature to the desired level.

When the offgas oxygen concentration reaches a low and steady level and when sufficient $CO_2$ appears in the offgas to act as a portion or all of the inert diluting gas, the flow of inert diluent gas started in step (g) is reduced or shut off. The wet oxidation system is now completely started up and operating at steady state.

To shut down a wet oxidation system which uses pure oxygen, the same three criteria must be met to ensure the safety of the operation, namely:

1. From a time before the flow of oxygen is started until after the flow of oxygen is shut off the reactor contents must be maintained in a state of having potential for oxidation.

2. Before the flow of oxygen is started to the wet oxidation process a continuous purge of a diluent gas into the reactor must be started. The flow of some diluent gas whether from an outside source or generated in situ, must be continued in the reactor until the flow of oxygen is shut off.

3. From a time before the introduction of oxygen to the wet oxidation system until after the oxygen flow is shut off the oxygen supply pipelines up to the point at which the oxygen is actually mixed with the waste or fuel mixture must be clean for oxygen service and must be under a continuous purge of water.

When the wet oxidation reactor is to be shut down to a completely cooled condition, i.e. to less than about 212° F. and atmospheric pressure, the safe operating criteria are met by the following sequential steps:

(a) shut off the flow of pure oxygen to the reactor;
(b) start a purge of inert diluent gas to the reactor;
(c) halt the introduction of combustible substances to the reactor and begin introducing a flow of water into the reactor;
(d) stop the purge of inert diluent gas of step (b) when substantially all of the oxygen in the reactor is purged therefrom;
(e) stop the flow of water of step (c) into the reactor when the temperature of the reactor contents is reduced to a temperature below 250° F.;
(f) slowly depressurize the reactor to essentially atmospheric pressure; and
(g) shutting off the stream of purge water to the oxygen introducing means.

Each of these steps are needed to meet the requirements of the three criteria for safe operation and are thus the steps needed to practice the invention. Obviously other steps could be added to the safe shut down procedure, for example, an eighth step to drain and flush out the reactor. However, as long as the seven steps above are carried out, in sequence, the requirements of the invention are met.

If the wet oxidation system is to be shut down to a hot bottled condition where the reactor contains liquid at elevated temperature and superatmospheric pressure, the following steps are needed to satisfy the three criteria for safe operation:

(a) shut off the flow of pure oxygen to the reactor;
(b) start a purge of inert diluent gas to the reactor;
(c) stop the introduction of combustible substance to the reactor and begin introduction of a flow of water into the reactor;
(d) stop the purge of inert diluent gas in step (b) when substantially all of the oxygen in the reactor is purged therefrom;
(e) stop the flow of water begun in step (c); and
(f) shut off the stream of purge water into the oxygen introducing means.

As before, additional steps could be added to the procedure for shuting down the wet oxidation system to a hot bottle system. Any procedure, however, that contains at least the six steps listed above in the order discussed will satisfy the criteria for safe operation of a wet oxidation system and the requirements of this invention.

In the preferred embodiment, step (a) precedes steps (b) through (f), step (c) precedes step (e) and steps (a) through (e) precede step (f).

We claim:

1. A method for startup, operation and shutdown of a wet oxidation apparatus which uses a flow of pure oxygen for oxidizing combustible substances, said apparatus including a reactor, valved means for introducing water and combustible substance into said reactor, valved means for introducing a flow of pure oxygen into said reactor, valved means for passing gaseous and liquid combustion products from said reactor, valved means for introducing a stream of purge water into oxygen introducing means, valved means for introducing cleaning solution into said oxygen introducing means, and valved means for purging said reactor with an inert diluent gas, said method comprising the steps of: initiating a potential for oxidation in said reactor prior to starting the flow of oxygen to said reactor, and maintaining the potential for oxidation until the flow of oxygen is stopped; starting a continuous purge of inert diluent gas into said reactor prior to starting the flow of oxygen, and continuing the addition or in situ generation of inert gas in the reactor until after the flow of oxygen is stopped; and cleaning the portion of the oxygen introducing means within said reactor with a cleaning solution and subsequently introducing a stream of purge water into oxygen introduction means prior to starting the flow of oxygen to said reactor, and continuing the flow of said purge water until after said flow of oxygen is stopped.

2. A method for startup, operation and shutdown of a wet oxidation apparatus according to claim 1, further comprising startup steps which precede the introduction of said stream of pure oxygen into said reactor, said steps comprising:

(a) filling said reactor to a predetermined operating level with water or a water-combustible substance mixture;
(b) heating said reactor and water or water-combustible substance mixture to a temperature equalling or exceeding the ignition temperature;
(c) introducing into said reactor a compressed inert diluent gas to pressurize said reactor to a pressure in excess of the saturated steam pressure at the ignition temperature;
(d) introducing a flow of combustible substance to said reactor;
(e) introducing a cleaning solution into said oxygen introducing means to clean said oxygen introducing means for oxygen service;
(f) introducing a stream of purge water into said oxygen introducing means; and
(g) introducing a continuous purge of said reactor with an inert diluent gas.

3. A method for startup, operation and shutdown of a wet oxidation apparatus according to claim 2, wherein step (a) precedes steps (b) and (d), steps (c) precedes step (g) but follows step (a), and step (e) precedes step (f).

4. A method for startup, operation and shutdown of a wet oxidation apparatus according to claim 1, wherein prior to startup the reactor contains liquid at elevated temperature and super atmospheric pressure, further comprising startup steps which precede the introduction of said stream of pure oxygen into said reactor, said steps comprising:

(a) flooding with water each of said means for introducing water, oxygen and inert gas;
(b) heating the reactor contents to a temperature equalling or exceeding the ignition temperature;
(c) introducing into said reactor a compressed inert diluent gas to pressurize said reactor to a pressure in excess of the saturated steam pressure at the ignition temperature;
(d) introducing a flow of combustible substance to said reactor;
(e) introducing a cleaning solution into said oxygen introducing means to clean said oxygen introducing means for oxygen service;
(f) introducing a stream of purge water into said oxygen introducing means; and
(g) introducing a continuous purge of said reactor with an inert diluent gas.

5. A method for startup, operation and shutdown of a wet oxidation apparatus according to claim 4, wherein step (a) precedes steps (b) through (g), step (c) precedes step (g), and step (e) precedes step (f).

6. A method for startup, operation and shutdown of a wet oxidation apparatus according to claim 1, further comprising sequential shutdown steps resulting in a cooled reactor, said sequential shutdown steps comprising:

(a) shutting off the flow of pure oxygen to said reactor;

(b) starting a purge of inert diluent gas to said reactor;

(c) stopping the introduction of combustible substance to said reactor and beginning introduction of a flow of water into said reactor;

(d) stopping said purge of inert diluent gas to said reactor when substantially all of the oxygen in the reactor is purged therefrom;

(e) stopping said flow of water into said reactor when the temperature of the reactor contents is reduced to below 250° F.;

(f) slowly depressurizing said reactor to essentially atmospheric pressure; and (g) shutting off said stream of purge water into oxygen introducing means.

7. A method for startup, operation and shutdown of a wet oxidation apparatus according to claim 1, further comprising shutdown steps resulting in a reactor containing liquid at elevated temperature and superatmospheric pressure, said shutdown steps comprising:

(a) shutting off the flow of pure oxygen to said reactor;

(b) starting a purge of inert diluent gas to said reactor;

(c) stopping the introduction of combustible substance to said reactor and beginning introduction of flow of water into said reactor;

(d) stopping said purge of inert diluent gas to said reactor when substantially all of the oxygen in the reactor is purged therefrom;

(e) stopping said flow of water of step (c); and (f) shutting off said stream of purge water into oxygen introducing means.

8. A method for startup, operation and shutdown of a wet oxidation apparatus according to claim 7, wherein step (a) precedes steps (b) through (f), step (c) precedes step (e), and steps (a) through (e) precede step (f).

* * * * *